United States Patent
Kearney et al.

(10) Patent No.: US 8,985,459 B2
(45) Date of Patent: Mar. 24, 2015

(54) DECODABLE INDICIA READING TERMINAL WITH COMBINED ILLUMINATION

(75) Inventors: Sean Philip Kearney, Marlton, NJ (US); Patrick Anthony Giordano, Glassboro, NJ (US); Charles Joseph Cunningham, Havertown, PA (US); Desmond Bond, Phildelphia, PA (US); Thomas Amundsen, Turnersville, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 78 days.

(21) Appl. No.: 13/174,333

(22) Filed: Jun. 30, 2011

(65) Prior Publication Data

US 2013/0001312 A1  Jan. 3, 2013

(51) Int. Cl.
*G06K 19/00* (2006.01)
*G06K 7/10* (2006.01)

(52) U.S. Cl.
CPC ........ *G06K 7/10722* (2013.01); *G06K 7/10564* (2013.01); *G06K 7/10732* (2013.01)
USPC ...... 235/462.06; 235/435; 235/439; 235/451; 235/462.01

(58) Field of Classification Search
USPC ............. 235/462.06, 462.11, 462.17, 462.27, 235/462.3, 462.41, 462.42, 470
See application file for complete search history.

(56) References Cited

U.S. PATENT DOCUMENTS 4,983,817 A  1/1991 Dolash et al.
5,019,699 A  5/1991 Koenck (Continued)

OTHER PUBLICATIONS

U.S. Appl. No. 13/174,333, filed Jun. 30, 2011.

(Continued)

*Primary Examiner* — Matthew Mikels
(74) *Attorney, Agent, or Firm* — Additon, Higgins & Pendleton, P.A.

(57) ABSTRACT

A decodable indicia reading terminal can comprise a laser-based scanner, an imager-based scanner, a central processing unit (CPU), and an illumination assembly. The laser-based scanner can include a laser source, a photo-detector, and an analog-to-digital (A/D) converter. The laser source can be configured to emit a laser beam onto a substrate bearing decodable indicia. The photo-detector can be configured to receive a beam of a variable intensity reflected by the decodable indicia, and to output a first analog signal representative of the variable intensity. The A/D converter can be configured to convert the first analog signal into a first digital signal. The imager-based scanner can include a multiple pixel image sensor, an imaging lens, and an A/D converter. The imaging lens can be configured to focus an image of the decodable indicia on the image sensor. The A/D converter can be configured to convert into a second digital signal a second analog signal read out of the image sensor and representative of light incident on the image sensor. The CPU can be configured to output a decoded message data corresponding to the decodable indicia by processing the first digital signal and/or the second digital signal. The illumination assembly can include an indicator light bar and an illumination light bar. The ON/OFF state and color of the indicator light bar can reflect the state of the decodable indicia reading terminal. The illumination light bar can be configured to generate a high intensity illumination for illuminating the substrate bearing the decodable indicia. The wavelength of the light generated by the indicator light bar can be substantially equal to the wavelength of the light generated by the illumination light bar, and the light generated by the illumination light bar can have a very low perceived intensity.

20 Claims, 4 Drawing Sheets

(56) References Cited

U.S. PATENT DOCUMENTS

| | | |
|---|---|---|
| 5,406,062 A | 4/1995 | Hasegawa et al. |
| 5,504,367 A | 4/1996 | Arackellian et al. |
| 5,541,419 A | 7/1996 | Aracellian |
| 5,572,006 A | 11/1996 | Wang et al. |
| 5,576,529 A | 11/1996 | Koenck et al. |
| 5,591,955 A | 1/1997 | Laser |
| 5,646,390 A | 7/1997 | Wang et al. |
| 5,648,650 A | 7/1997 | Sugifune et al. |
| 5,701,001 A | 12/1997 | Sugifune et al. |
| 5,734,153 A | 3/1998 | Swartz et al. |
| 5,756,981 A | 5/1998 | Roustaei et al. |
| 5,784,102 A | 7/1998 | Hussey et al. |
| 5,789,730 A | 8/1998 | Rockstein et al. |
| 5,789,731 A | 8/1998 | Amundsen et al. |
| 5,815,200 A | 9/1998 | Ju et al. |
| 5,834,749 A | 11/1998 | Durbin |
| 5,877,487 A | 3/1999 | Tani et al. |
| 5,886,337 A | 3/1999 | Rockstein et al. |
| 5,886,338 A | 3/1999 | Arackellian et al. |
| 6,010,070 A | 1/2000 | Mizuochi et al. |
| 6,029,894 A | 2/2000 | Amundsen et al. |
| 6,073,851 A | 6/2000 | Olmstead et al. |
| 6,138,915 A | 10/2000 | Danielson et al. |
| 6,160,250 A | 12/2000 | Miksch et al. |
| 6,209,789 B1 | 4/2001 | Amundsen et al. |
| 6,230,975 B1 | 5/2001 | Colley et al. |
| 6,254,003 B1 | 7/2001 | Pettinelli et al. |
| 6,283,374 B1 | 9/2001 | Fantone et al. |
| 6,294,776 B2 | 9/2001 | Miksch et al. |
| 6,347,163 B2 | 2/2002 | Roustaei |
| 6,412,700 B1 | 7/2002 | Blake et al. |
| 6,669,093 B1 * | 12/2003 | Meyerson et al. ........ 235/472.01 |
| 6,695,209 B1 | 2/2004 | La |
| 6,749,120 B2 | 6/2004 | Hung et al. |
| 6,832,725 B2 | 12/2004 | Gardiner et al. |
| 6,877,661 B2 | 4/2005 | Webb et al. |
| 7,017,813 B2 | 3/2006 | Blake et al. |
| 7,061,395 B1 | 6/2006 | Bromer |
| 7,077,321 B2 | 7/2006 | Longacre, Jr. et al. |
| 7,083,097 B2 | 8/2006 | Toyama et al. |
| 7,083,098 B2 | 8/2006 | Joseph et al. |
| 7,185,817 B2 | 3/2007 | Zhu et al. |
| 7,219,843 B2 | 5/2007 | Havens et al. |
| 7,234,641 B2 | 6/2007 | Olmstead |
| 7,240,844 B2 | 7/2007 | Zhu et al. |
| 7,255,279 B2 | 8/2007 | Zhu et al. |
| 7,270,274 B2 | 9/2007 | Hennick et al. |
| 7,303,126 B2 | 12/2007 | Patel et al. |
| 7,308,375 B2 | 12/2007 | Jensen et al. |
| 7,320,431 B2 | 1/2008 | Zhu et al. |
| 7,336,197 B2 | 2/2008 | Ding et al. |
| 7,357,326 B2 | 4/2008 | Hattersley et al. |
| 7,387,250 B2 | 6/2008 | Mani |
| 7,398,927 B2 | 7/2008 | Olmstead et al. |
| 7,490,778 B2 | 2/2009 | Zhu et al. |
| 7,503,499 B2 | 3/2009 | Zhu et al. |
| 7,513,430 B2 | 4/2009 | Zhu et al. |
| 7,516,899 B2 | 4/2009 | Laser |
| 7,527,207 B2 | 5/2009 | Acosta et al. |
| 7,533,824 B2 | 5/2009 | Hennick et al. |
| 7,568,628 B2 | 8/2009 | Wang et al. |
| 7,611,060 B2 | 11/2009 | Wang et al. |
| 7,656,556 B2 | 2/2010 | Wang |
| 7,693,744 B2 | 4/2010 | Forbes |
| 7,735,737 B2 | 6/2010 | Kotlarsky et al. |
| 7,762,464 B2 | 7/2010 | Goren et al. |
| 7,770,799 B2 | 8/2010 | Wang |
| 7,775,436 B2 | 8/2010 | Knowles |
| 7,780,089 B2 | 8/2010 | Wang |
| 7,809,407 B2 | 10/2010 | Oshima et al. |
| 7,810,720 B2 | 10/2010 | Lovett |
| 7,813,047 B2 | 10/2010 | Wang et al. |
| 7,909,257 B2 | 3/2011 | Wang et al. |
| 7,918,398 B2 | 4/2011 | Li et al. |
| 7,995,178 B2 | 8/2011 | Suguro et al. |
| 8,074,887 B2 | 12/2011 | Havens et al. |
| 2001/0000615 A1 | 5/2001 | Amundsen et al. |
| 2001/0006150 A1 | 7/2001 | Taniike et al. |
| 2001/0006151 A1 | 7/2001 | Leerkamp et al. |
| 2001/0006152 A1 | 7/2001 | Henderson et al. |
| 2001/0006153 A1 | 7/2001 | Merrell et al. |
| 2001/0006154 A1 | 7/2001 | Krug et al. |
| 2001/0006156 A1 | 7/2001 | Pereira et al. |
| 2001/0006157 A1 | 7/2001 | Ogasawara |
| 2001/0006158 A1 | 7/2001 | Ho et al. |
| 2001/0006159 A1 | 7/2001 | Happ et al. |
| 2003/0062413 A1 | 4/2003 | Gardiner et al. |
| 2003/0222147 A1 | 12/2003 | Havens et al. |
| 2004/0020990 A1 | 2/2004 | Havens et al. |
| 2004/0164165 A1 | 8/2004 | Havens et al. |
| 2005/0001035 A1 * | 1/2005 | Hawley et al. ........... 235/462.21 |
| 2005/0023356 A1 | 2/2005 | Wiklof et al. |
| 2005/0103854 A1 | 5/2005 | Zhu et al. |
| 2005/0279836 A1 | 12/2005 | Havens et al. |
| 2006/0011724 A1 | 1/2006 | Joseph et al. |
| 2006/0043194 A1 | 3/2006 | Barkan et al. |
| 2006/0113386 A1 * | 6/2006 | Olmstead ........................ 235/454 |
| 2006/0163355 A1 | 7/2006 | Olmstead et al. |
| 2006/0202036 A1 | 9/2006 | Wang et al. |
| 2007/0051812 A1 * | 3/2007 | Lopez et al. ................... 235/454 |
| 2007/0138293 A1 | 6/2007 | Zhu et al. |
| 2007/0181692 A1 | 8/2007 | Barkan et al. |
| 2007/0241195 A1 * | 10/2007 | Hussey et al. ............ 235/462.21 |
| 2007/0284447 A1 | 12/2007 | McQueen |
| 2008/0023556 A1 | 1/2008 | Vinogradov et al. |
| 2008/0223933 A1 | 9/2008 | Smith |
| 2009/0001171 A1 * | 1/2009 | Carlson et al. ........... 235/462.41 |
| 2009/0026267 A1 | 1/2009 | Wang et al. |
| 2009/0057413 A1 | 3/2009 | Vinogradov et al. |
| 2009/0072038 A1 | 3/2009 | Li et al. |
| 2009/0140050 A1 | 6/2009 | Liu et al. |
| 2010/0044436 A1 | 2/2010 | Powell et al. |
| 2010/0044440 A1 | 2/2010 | Wang et al. |
| 2010/0078477 A1 | 4/2010 | Wang et al. |
| 2010/0090007 A1 * | 4/2010 | Wang et al. ............... 235/462.11 |
| 2010/0108769 A1 | 5/2010 | Wang et al. |
| 2010/0147956 A1 | 6/2010 | Wang et al. |
| 2011/0049245 A1 | 3/2011 | Wang |
| 2011/0163165 A1 | 7/2011 | Liu et al. |
| 2011/0174880 A1 | 7/2011 | Li et al. |
| 2012/0000982 A1 | 1/2012 | Gao et al. |
| 2012/0111944 A1 | 5/2012 | Gao et al. |
| 2012/0138684 A1 | 6/2012 | Van Volkinsburg et al. |
| 2012/0153022 A1 | 6/2012 | Havens et al. |
| 2012/0193429 A1 | 8/2012 | Van Volkinsburg et al. |

OTHER PUBLICATIONS

U.S. Appl. No. 13/309,195, filed Dec. 1, 2011.
U.S. Appl. No. 13/170,104, filed Jun. 27, 2011.
U.S. Appl. No. 13/324,197, filed Dec. 13, 2011.
U.S. Appl. No. 13/428,500, filed Mar. 23, 2012.

* cited by examiner

DECODABLE INDICIA READING TERMINAL WITH COMBINED ILLUMINATION

FIELD OF THE INVENTION

This invention relates generally to decodable indicia reading terminals and, more specifically, to optical indicia reading terminals comprising a laser scanner.

BACKGROUND OF THE INVENTION

The use of optical indicia, such as bar code symbols, for product and article identification is well known in the art. Presently, various types of indicia reading terminals have been developed, such as hand-held bar code scanners, hands-free scanners, bi-optic in-counter scanners, and mobile computers such as personal digital assistants (PDAs).

One common type of scan engine found in hand-held and retail scanners is the laser-based scan engine, which uses a focused laser beam to sequentially scan the bars and spaces of a bar code symbol pattern to be read. As the laser beam is scanned across the bar code symbol, a portion of the reflected light beam is collected by optics within the scanner. The collected light signal can subsequently be focused upon a photo-detector within the scanner. The photo-detector can, in one example, generate an analog electrical signal which can be converted into a digital signal representative of the bar code symbol.

Another common type of indicia reading terminal is the digital imager, which includes 1D (linear) imagers and 2D (area) imagers. Digital imagers typically utilize light emitting diodes (LEDs) and a lens to focus the image of the bar code onto a multiple pixel image sensor, which is often provided by a complementary metal-oxide semiconductor (CMOS) image sensor that converts light signals into electric signals. The LEDs simultaneously illuminate all of the bars and spaces of a bar code symbol with light of a specific wavelength in order to capture an image for recognition and decoding purposes.

SUMMARY OF THE INVENTION

In one embodiment, there is provided a decodable indicia reading terminal comprising a laser-based scanner, an imager-based scanner, a central processing unit (CPU), and an illumination assembly. The laser-based scanner can include a laser source, a photo-detector, and an analog-to-digital (A/D) converter. The laser source can be configured to emit a laser beam onto a substrate bearing decodable indicia. The photo-detector can be configured to receive a beam of a variable intensity reflected by the decodable indicia, and to output a first analog signal representative of the variable intensity. The A/D converter can be configured to convert the first analog signal into a first digital signal. The imager-based scanner can include a multiple pixel image sensor, an imaging lens, and an A/D converter. The imaging lens can be configured to focus an image of the decodable indicia on the image sensor. The A/D converter can be configured to convert into a second digital signal a second analog signal read out of the image sensor and representative of light incident on the image sensor. The CPU can be configured to output a decoded message data corresponding to the decodable indicia by processing the first digital signal and/or the second digital signal. The illumination assembly can include an indicator light bar and an illumination light bar. The ON/OFF state and color of the indicator light bar can reflect the state of the decodable indicia reading terminal. The illumination light bar can be located spatially close to the indicator light bar and can be configured to generate a high intensity illumination for illuminating the substrate bearing the decodable indicia. The wavelength of the light generated by the indicator light bar can be substantially equal to the wavelength of the light generated by the illumination light bar, and the light generated by the illumination light bar can have a very low perceived intensity.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

One of the key challenges for bar code scanning and imaging is the requirement of intense illumination. The magnitude of illumination intensity is directly correlated to the motion tolerance performance of the bar code scanning device. Current product development of the hybrid (laser/imaging) bi-optic devices demand that the embedded imager perform with extremely high motion tolerance but yield the lowest illumination intensity possible.

Figure 1:
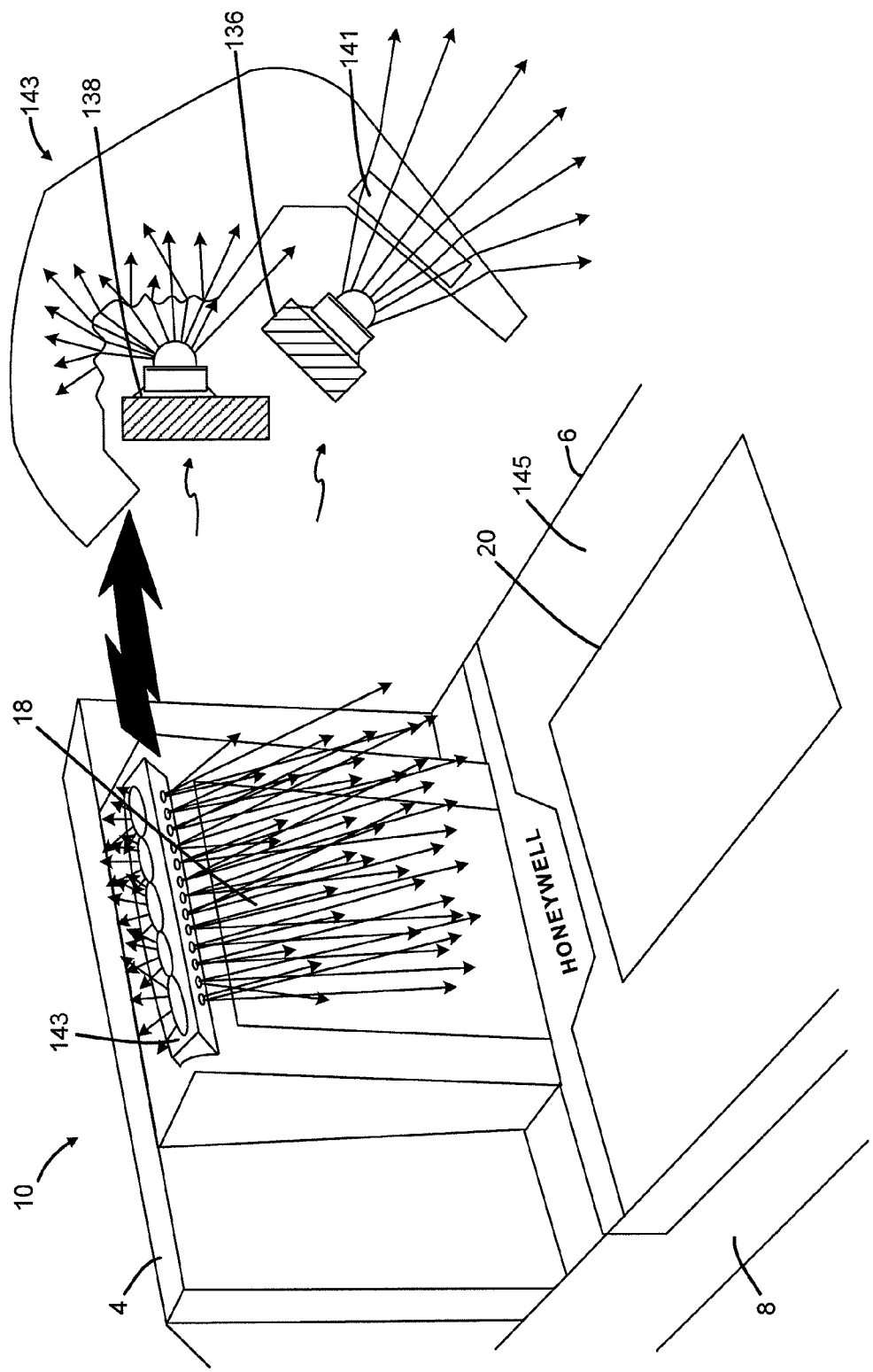
FIG. 1 schematically illustrates one embodiment of a decodable indicia reading terminal.

In one embodiment, there is provided a decodable indicia reading terminal 10 schematically shown in FIG. 1. The decodable indicia reading terminal 10 can include a first scanning window 18 and a second scanning window 20. The first scanning window 18 can be positioned in a first section 4 of scanning terminal housing 8, while the second scanning window 20 can be positioned in a second section 6 of scanning terminal housing 8. As illustrated, the first scanning window 18 and second scanning window 20 can be substantially orthogonal to each other. In some embodiments, the first scanning window 18 and second scanning window 20 may be arranged side by side, or the first scanning window 18 and second scanning window 20 may be arranged at an angle less than 90° with respect to each other.

In a further aspect, the decodable indicia reading terminal 10 can comprise a laser-based scanner which can be located behind the first scanning window 18 or the second scanning window 20.

In a further aspect, the decodable indicia reading terminal 10 can further comprise a one-dimensional (1D) or two-dimensional (2D) imager-based scanner which can be located behind one of the scanning windows 18, 20.

Figure 2:
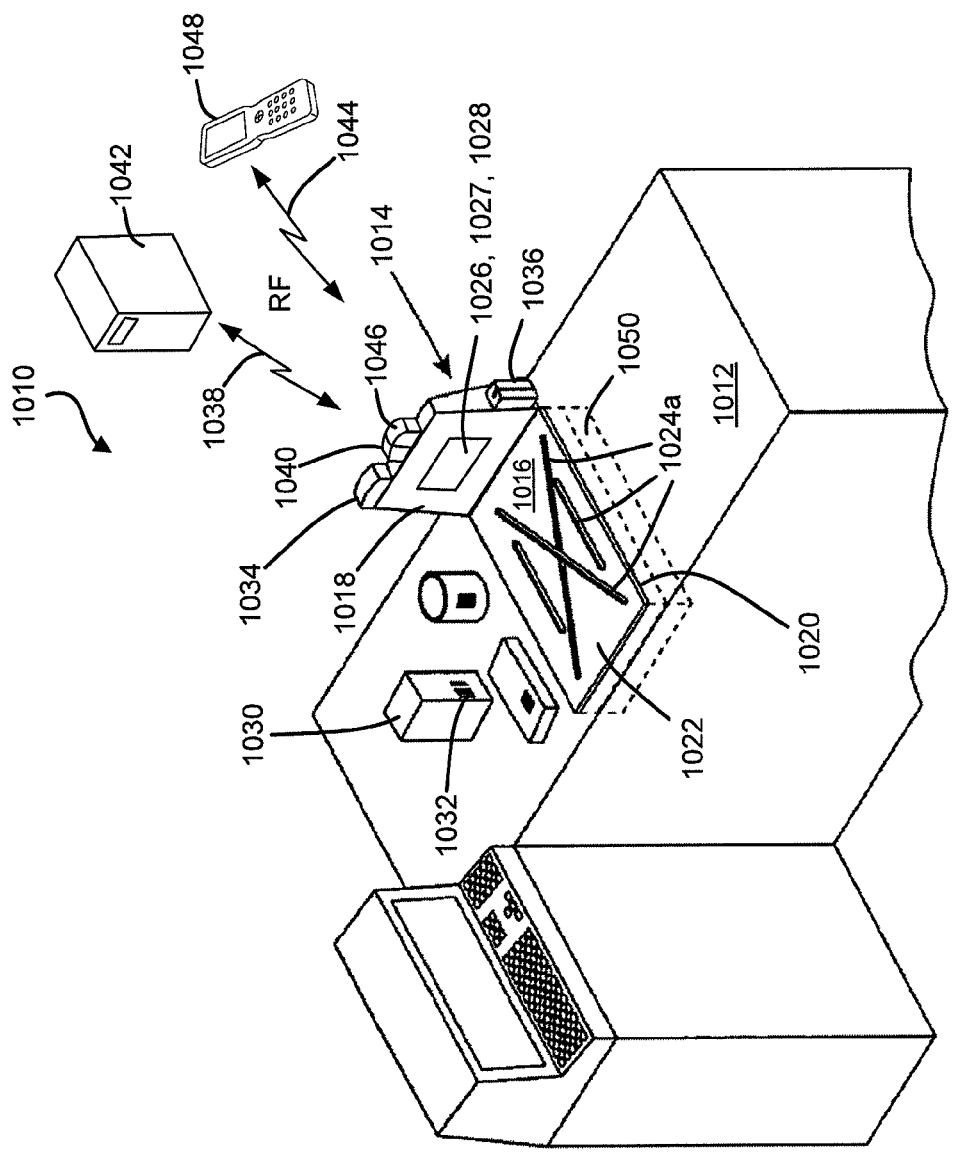
FIG. 2 schematically illustrates one embodiment a point-of-sale workstation comprising a decodable indicia reading terminal.

In one embodiment, the decodable indicia reading terminal can be incorporated into a point-of-sale workstation used by retailers to process purchase transactions involving products bearing decodable indicia, e.g., a UPC symbol, as shown in FIG. 2. The point-of-sale workstation 1010 can include a horizontal countertop 1012 for placement of products to be scanned. A decodable indicia reading terminal provided by a bi-optic scanner 1014 can be mounted within the countertop 1012. The bi-optic scanner 1014 can include a horizontally-disposed housing portion 1016 and a vertically disposed housing portion 1018 which can project from one end of the horizontally-disposed housing portion in a substantially orthogonal manner.

In one embodiment, the horizontally-disposed housing portion 1012 can comprise a first laser-based indicia scanner and the vertically-disposed housing portion 1018 can comprise a second laser-based indicia scanner and an imager-based scanner. The countertop 1012 can include an optically transparent (e.g., glass) horizontal-scanning window 1020 which can be mounted flush with the checkout counter, and can be covered by an imaging window protection plate 1022 having a pattern of apertures 1024a. These apertures 1024 permit the projection of a plurality of vertical illumination planes from the first laser-based scanner located beneath the horizontal-scanning window 1020. The vertically-disposed housing portion 1018 of the bi-optic scanner 1014 can further include a vertical-scanning window 1026 behind which the second laser-based scanner 1027 and the imager-based scanner 1028 can be housed.

In another embodiment, a second imager-based scanner can be disposed behind the horizontal scanning window 1020. A skilled artisan would appreciate the fact that other ways of disposing the scanners and scanning windows are within the scope of this disclosure.

A product 1030 having decodable indicia 1032 may be scanned by the bi-optic scanner 1014. If the decodable indicia 1032 is located on the bottom of the product 1030, one or more of the scan lines projected through the horizontal-scanning window 1020 can traverse the decodable indicia for decoding. If the decodable indicia 1032 is located on the side of the product, then an image of the decodable indicia can be captured by the imager-based scanner 1028 and processed for decoding.

As used herein, "decodable indicia" is intended to denote a representation of a message, such as the representation in a bar code symbology of a character string comprising alphanumeric and non-alphanumeric characters. Decodable indicia can be used to convey information, such as the identification of the source and the model of a product, for example in a UPC bar code that comprises twelve encoded symbol characters representing numerical digits.

In one embodiment, the workstation 1010 can further include a radio frequency identification (RFID) reader 1034; a credit card reader 1036; a wide-area wireless (WIFI) interface 1038 including RF transceiver and antenna 1040 for connecting to the TCP/IP layer of the Internet as well as one or more storing and processing relational database management system (RDBMS) server 1042; a Bluetooth 2-way communication interface 1044 including RF transceivers and antenna 1046 for connecting to Bluetooth-enabled hand-held scanners, imagers, PDAs, portable computers and the like 1048, for control, management, application and diagnostic purposes. The workstation 1010 can further include an electronic weight scale module 1050 employing one or more load cells positioned centrally below the system's structurally rigid platform for bearing and measuring substantially all of the weight of objects positioned on the horizontal-scanning window 1020 or window protection plate 1022, and generating electronic data representative of measured weight of such objects.

The bi-optic scanner configuration described herein supra is exemplary, and is not limited to a construction having horizontal and vertical scan windows. In another embodiment, a bi-optic scanner can include a single scan window, with a laser-based scanner and an imager-based scanner disposed behind it. A skilled artisan would appreciate the fact that other arrangements of the laser-based scanner and imager-based scanner within the housing of the decodable indicia reading terminal and relative to one or more scanning windows are within the scope of this disclosure.

Figure 3:
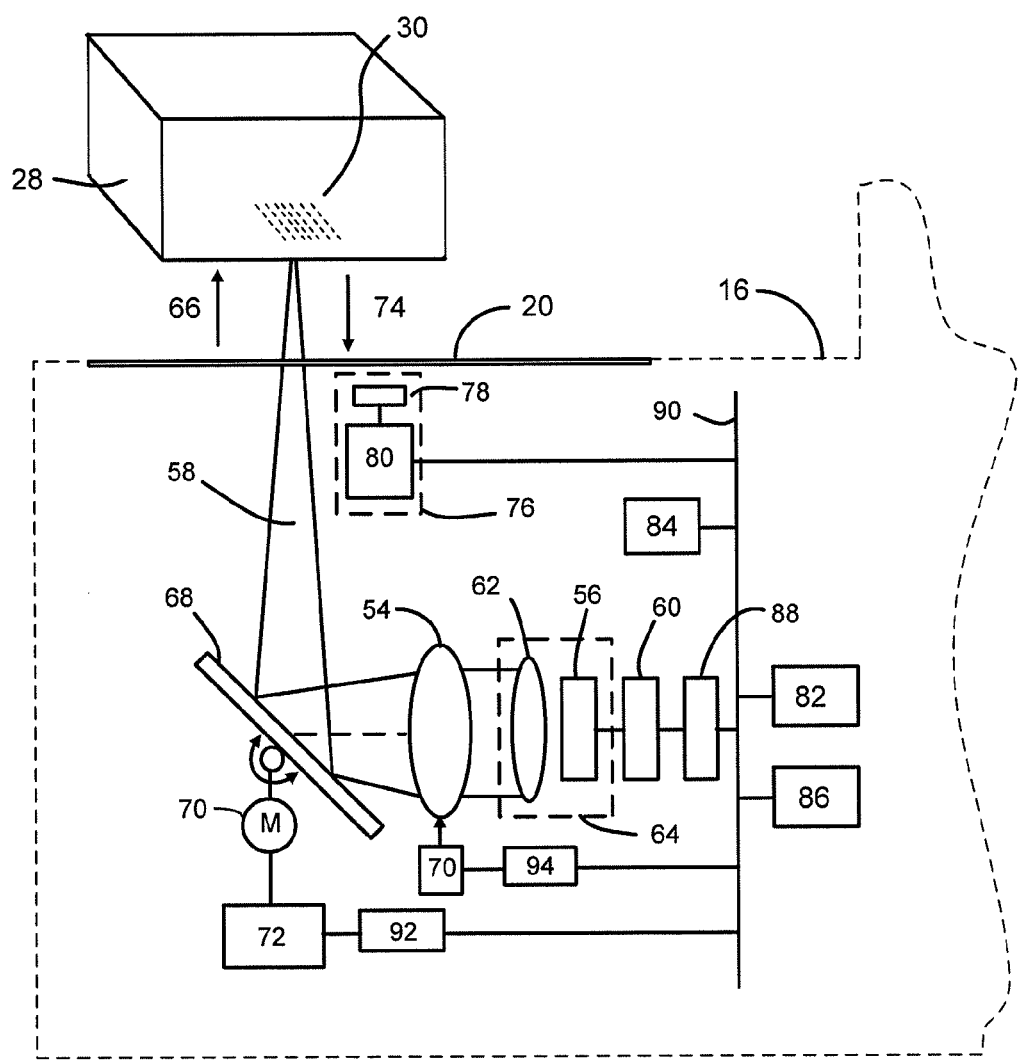
FIG. 3 illustrates a component diagram of a laser-based scanner which can be incorporated in one embodiment of the indicia reading terminal.

FIG. 3 illustrates a component diagram of a laser-based scanner which can be incorporated in one embodiment of the indicia reading terminal 10 of FIG. 1. The laser-based scanner 12 can comprise a lens assembly 54, which can include a fixed lens, a variable position lens holder adapted for use with a moveable lens system, or a variable focus fluid lens, for example. The laser scanner 12 can further comprise a laser source 56 which can emit a laser beam. The laser source 56 can be coupled to a laser source control circuit 60. Light from the laser source 56 can be shaped by the collimating optics 62 and the lens assembly 54. The combination of the laser source 56 and the collimating optics 62 can be regarded as a laser diode assembly 64. The laser beam emitted by the laser source 56 can illuminate the substrate 28, which in one embodiment can bear the decodable indicia 30. A scanning mirror reflector 68 disposed within the optical path of the laser beam emitter by the laser source 56 can oscillate to direct the laser beam across the entire surface to be scanned. Reflector 68 can be driven by a scan motor 70 which can be coupled to control circuit 72.

The laser beam emitted by the laser source 56 can reflect off the product 28 and then travel back to the photo-detector assembly 76. In the example wherein the product 28 includes a bar code, the incident laser light can be reflected by areas of dark and white bands. The reflected beam can thus have variable intensity representative of the bar code pattern. Photo-detector assembly 76 including photo-detector 78 and analog-to-digital (A/D) converter 80 can receive the reflected beam of variable intensity, generate an analog signal corresponding to the reflected beam, and convert it to a digital signal representative of the beam intensity for storage into memory 82 where it can be processed by CPU 84 in accordance with a program stored in the non-volatile memory 86, provided in a particular example by an EPROM.

For attempting to decode a bar code symbol, CPU 84 can process a digital signal corresponding to the reflected laser beam to determine a spatial pattern of dark cells and light cells and can then convert each light and dark cell pattern determined into a character of character string via table lookup, and finally can output a decoded message data corresponding to the decodable indicia.

In a further aspect, laser scanner 12 can include various interface circuits allowing CPU 84 to communicate with various circuits of scanner 12 including first interface circuit 88 coupled to laser source control circuit 60 and system bus 90, second interface circuit 92 coupled to motor control circuit 72, and third interface circuit 94 coupled to electrical power input unit 96.

Figure 4:
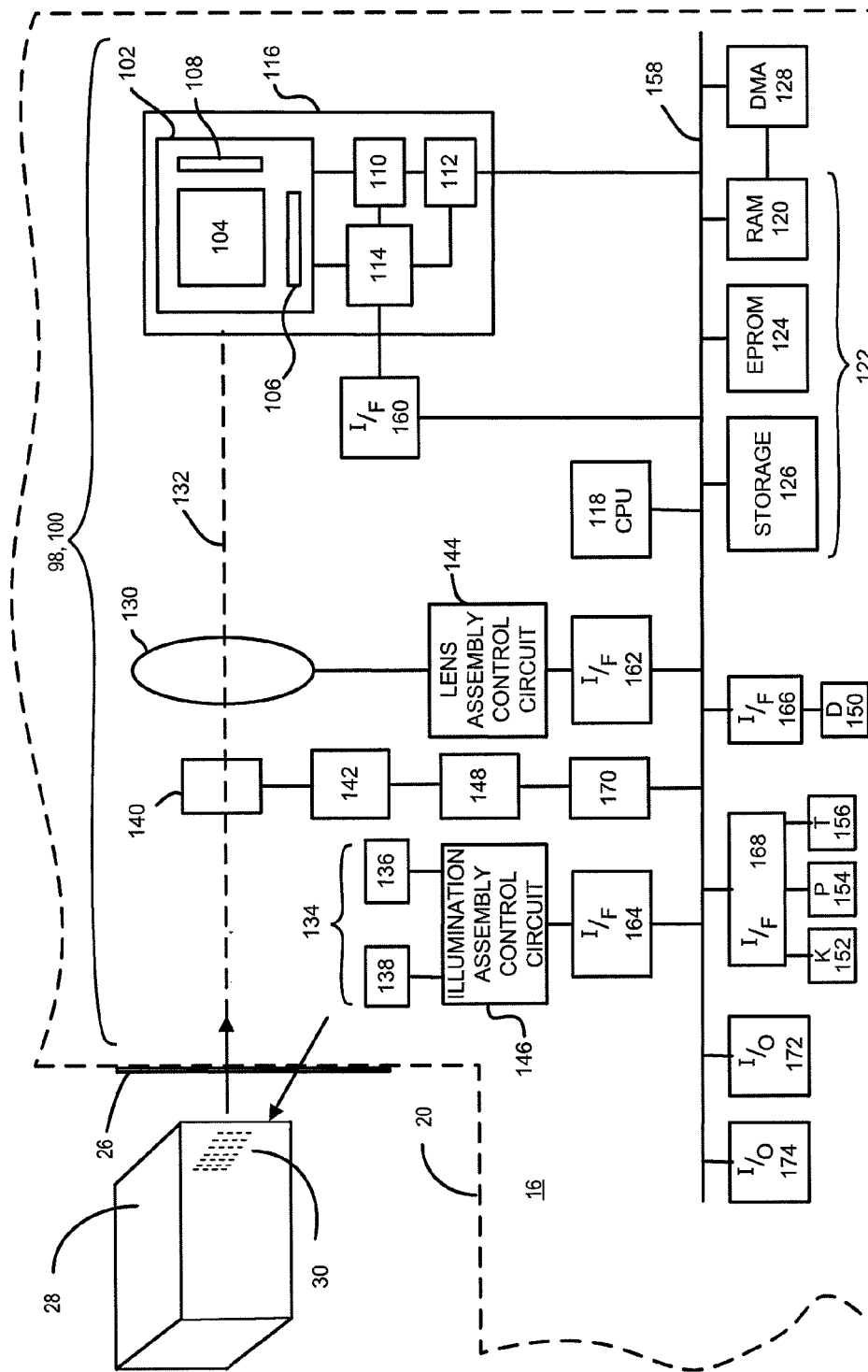
FIG. 4 illustrates a component diagram of an imager-based scanner which can be incorporated in one embodiment of the indicia reading terminal.

Referring now to FIG. 4, described is a component diagram of an imager-based scanner which can be incorporated in one embodiment of the indicia reading terminal 10 of FIG. 1. The imager-based scanner 98 can comprise a multiple pixel image sensor assembly 100, or optical imager, such as a CCD image sensor or a CMOS image sensor.

The image sensor assembly 100 can include an image sensor 102 comprising a multiple pixel image sensor 104 having pixels arranged in rows and columns of pixels, column circuitry 106, and row circuitry 108. Associated with the image sensor 102 can be amplifier circuitry 110, and an A/D converter 112 which can convert image information in the form of analog signals read out of multiple pixel image sensor 104 into image information in the form of digital signals. Image sensor 102 can also have an associated timing and control circuit 114 for use in controlling, e.g., the exposure period of image sensor 102, and/or gain applied to the amplifier 110. The noted circuit components 102, 110, 112, and 114 can be packaged into a common image sensor integrated circuit 116.

In one embodiment, image sensor integrated circuit 116 can incorporate a Bayer pattern filter, and CPU 118 prior to subjecting a frame to further processing can interpolate pixel values for development of a monochrome frame of image data.

In the course of operation of the image sensor assembly 100, image signals can be read out of image sensor 102, converted and stored into a system memory such as RAM 120. A memory 122 of image sensor assembly 100 can include RAM 120, a nonvolatile memory such as EPROM 124, and a storage memory device 126 such as may be provided by a flash memory or a hard drive memory. In one embodiment, image sensor assembly 100 can include CPU 118 which can be adapted to read out image data stored in memory 122 and subject such image data to various image processing algorithms. Image sensor assembly 100 can include a direct memory access unit (DMA) 128 for routing image information read out from image sensor 102 that has been subject to conversion to RAM 120. In another embodiment, image sensor assembly 100 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 102 and RAM 120 are within the scope of this disclosure.

In a further aspect, the image sensor assembly 100 can include an imaging lens assembly 130 for focusing an image of the decodable indicia 30 onto image sensor 102. Imaging light rays can be transmitted about an optical axis 132. Lens assembly 130 can be controlled with use of lens assembly control circuit 144. Lens assembly control circuit 14444 can send signals to lens assembly 1300, e.g., for changing a focal length and/or a best focus distance of lens assembly 1300.

The image sensor assembly 10000 can further include a filter module 140 that comprises one or more optical filters, as well as in some embodiments an actuator assembly 142 that is coupled generally to the filter module, such as to the optical filters. The filter module 1400 can be located on either side of the imaging lens assembly 13030. Likewise, one or more of the optical filters within the filter module 1400 can be disposed on one or more surfaces of the imaging lens assembly 13030 and/or the image sensor Error! Reference source not found.2. Filter module 14040 can be controlled with use of a filter module control circuit 148, which can be coupled to the actuator assembly 14242.

Although not incorporated in the illustrated embodiments, image sensor assembly 1000 can also include a number of peripheral devices such as display 150 for displaying such information as image frames captured with use of image sensor assembly 1000, keyboard 152, pointing device 154, and trigger 156 which may be used to make active signals for activating frame readout and/or certain decoding processes.

Image sensor assembly 1000 can include various interface circuits for coupling several of the peripheral devices to system address/data bus (system bus) bus 158, for communication with second CPU 1188 also coupled to system bus 158. Image sensor assembly 100 can include interface circuit 160 for coupling image sensor timing and control circuit timing and control circuit 1144 to system bus 158, interface circuit 162 for coupling the lens assembly control circuit 14444 to system bus 158, interface circuit 164 for coupling the illumination assembly control circuit 146 to system bus 158, interface circuit 166 for coupling the display 150 to system bus 158, interface circuit 168 for coupling keyboard 152, pointing device 154, and trigger 156 to system bus 158, and interface circuit 170 for coupling the filter module control circuit 148 to system bus 158.

In a further aspect, image sensor assembly 1000 can include one or more I/O interfaces 172, 174 for providing communication with external devices (e.g., a cash register server, a store server, an inventory facility server, a image sensor assembly 100, a local area network base station, a cellular base station). I/O interfaces 172, 174 can be interfaces of any combination of known computer interfaces, e.g., Ethernet (IEEE 802.3), USB, IEEE 802.11, Bluetooth, CDMA, and GSM.

In order to capture an image by the imager-based scanner 98, the decodable indicia bearing substrate generally needs to be illuminated with a high intensity illumination in order to decrease the required exposure time. While integration of an imager-based scanner into a laser scanner-based system can compensate for known laser-based scanner shortcomings and improve the overall scanning performance, the illumination requirement can present a challenge, since a typical end user of the decodable indicia reading terminal can be accustomed to low intensity light emitted by traditional laser-based scanners, and hence presence of additional intense light source can cause end user's distraction resulting in reduced customer satisfaction.

In one embodiment, the decodable indicia reading terminal 10 can include an illumination assembly 134 that can comprise an illumination light bar 136 for generating an illumination pattern substantially corresponding to the field of view of the image sensor assembly 100, and an indicator light bar 138. Each of illumination light bar 136 and indicator light bar indicator light bar 138 can include one or more LEDs. The illumination assembly 134 comprising illumination light bar 136 and indicator light bar indicator light bar 138 can be controlled by an illumination assembly control circuit 146.

The ON/OFF state and color of the indicator light bar can reflect the state of the decodable indicia reading terminal. In one embodiment, the indicator light bar can remain lit whenever the bi-optic scanner is powered on. In one embodiment, the state and/or color of the indicator light bar can change responsive to scanning decodable indicia (e.g., a bar code). In one example, the indicator light bar can constantly emit red light to indicate the powered state of the bi-optic scanner, and can switch to blinking red light responsive to scanning decodable indicia. A skilled artisan would appreciate the fact that other modes of indicator light bar functioning are within the scope of this disclosure.

In one embodiment, the illumination light source can be "camouflaged" by locating the illumination light bar 136 spatially close to the indicator light bar 138 which already exists in a typical laser scanner-based system, as best viewed in FIG. 1. The optics 141 which in one embodiment can be incorporated in the light bar housing 143 can include both diffusing and directing optical properties.

In a further aspect, the light bar optics 141 can diffuse the light emitted by the light bars 136, 138 across the horizontal surface 145 of the decodable indicia reading terminal's housing 8. In one embodiment, the face of the horizontal surface 145 can be textured in order to further diffuse and soften the light emitted by the light sources 136, 138.

In one embodiment, the decodable indicia reading terminal can further comprise an additional set of light bar optics 147 provided by cylindrical or wedge shaped lenses that can further disperse the light emitted by the light sources 136, 138 across the horizontal surface 145, so that any observable side view of the light emitted by the light sources 136, 138 would be perceived as the indicating light.

In a further aspect, the illumination light source 136 can emit light of the red spectrum region, where the human eye is less responsive as compared to the green spectrum region. In one embodiment, the indicating light source 138 and the illumination light source 136 can emit light of the same wavelength, so that the color of the illumination light emitted by the illumination light source 136 could not be distinguished by the user of the decodable indicia reading terminal from the color of the indicating light emitted by the indicating light source 138.

In a further aspect, the illumination light LEDs can be pulsed with a pre-defined frequency in order to shorten the LED duty cycle. In one embodiment, the frequency of illumination pulses can be equal to the imager frame rate. In a further aspect, the pulse duration can be minimized. In one embodiment, the pulse duration can be equal to the imager integration time. In another embodiment, the pulse duration can be shorter than the imager integration time. In a yet another embodiment, the pulse duration can be shorter than a typical human eye integration time. In an illustrative embodiment, the illumination pulse frequency can be 60 cycles per second, each pulse having duration of 100 µs, thus producing a duty cycle of approximately 1.5%.

The "camouflaged" illumination light source can produce illumination with perceived intensity being very low, thus improving user experience and increasing user satisfaction.

A sample of systems and methods that are described herein follows:

A1. A decodable indicia reading terminal comprising:
a laser-based scanner disposed within a housing, said laser-based scanner including a laser source configured to emit a laser beam onto a substrate bearing decodable indicia, a photo-detector configured to receive a second beam of a variable intensity reflected by said decodable indicia and to output a first analog signal representative of said variable intensity, and a first analog-to-digital (A/D) converter configured to convert said first analog signal into a first digital signal representative of said first analog signal;
an imager-based scanner disposed within said housing, said imager-based scanner including a multiple pixel image sensor, an imaging lens configured to focus an image of said decodable indicia on said image sensor, and a second A/D converter configured to convert into a second digital signal a second analog signal read out of said image sensor, said second analog signal representative of light incident on said image sensor, said second digital signal representative of said second analog signal;
a central processing unit (CPU) configured to output a decoded message data corresponding to said decodable indicia by processing at least one of: said first digital signal, said second digital signal;
an illumination assembly including an indicator light bar configured to emit first light having a first wavelength, and an illumination light bar configured to generate an illumination having a high intensity for illuminating said substrate, by emitting second light having a second wavelength;
wherein said first wavelength is substantially equal to said second wavelength; and
wherein said second light has a low perceived intensity.

A2. The decodable indicia reading terminal of A1, wherein said first wavelength reflects a state of said decodable indicia reading terminal.

A3. The decodable indicia reading terminal of A1, wherein said indicator light bar can be in one of: ON state and OFF state, said state reflecting a state of said decodable indicia reading terminal.

A4. The decodable indicia reading terminal of A1, wherein said imager based scanner further comprises a Bayer pattern filter.

A5. The decodable indicia reading terminal of A1, wherein said illumination bar is located spatially close to said indicator light bar.

A6. The decodable indicia reading terminal of A1, wherein said illumination assembly further includes optics having diffusing and directing optical properties.

A7. The decodable indicia reading terminal of A1, wherein said illumination assembly further includes optics having diffusing and directing optical properties, said optics provided by one or more cylindrical- or wedge-shaped lens.

A8. The decodable indicia reading terminal of A1, wherein said indicator light bar includes one or more light-emitting diodes (LEDs).

A9. The decodable indicia reading terminal of A1, wherein said illumination light bar includes one or more LEDs.

A10. The decodable indicia reading terminal of A1, wherein said illumination light bar is configured to pulse with a pre-defined frequency.

A11. The decodable indicia reading terminal of A1, wherein said illumination light bar is configured to pulse with a frequency equal to a frame rate of said image sensor.

A12. The decodable indicia reading terminal of A1, wherein said illumination light bar is configured to pulse with a pre-defined frequency; and
wherein a duration of pulses is equal to an integration time of said image sensor.

A13. The decodable indicia reading terminal of A1, wherein said illumination light bar is configured to pulse with a pre-defined frequency; and
wherein a duration of pulses is shorter than an integration time of said image sensor.

A14. The decodable indicia reading terminal of A1, wherein said illumination light bar is configured to pulse with a pre-defined frequency; and
wherein a duration of pulses is shorter than an integration time of a typical human eye.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

We claim:
1. A decodable indicia reading terminal comprising:
a laser-based scanner disposed within a housing, said decodable indicia reading terminal defining a horizontal surface, said laser-based scanner including a laser source configured to emit a laser beam onto a substrate bearing decodable indicia, a photo-detector configured to receive a second beam of a variable intensity reflected by said decodable indicia and to output a first analog signal representative of said variable intensity, and a first analog-to-digital (A/D) converter configured to convert said first analog signal into a first digital signal representative of said first analog signal;

an imager-based scanner disposed within said housing, said imager-based scanner including a multiple pixel image sensor, an imaging lens configured to focus an image of said decodable indicia on said image sensor, and a second A/D converter configured to convert into a second digital signal a second analog signal read out of said image sensor, said second analog signal representative of light incident on said image sensor, said second digital signal representative of said second analog signal;

a central processing unit (CPU) configured to output a decoded message data corresponding to said decodable indicia by processing at least one of: said first digital signal, said second digital signal;

an illumination assembly including an indicator light bar configured to emit first light having a first wavelength, and an illumination light bar configured for illuminating said substrate, by emitting second light having a second wavelength;

wherein the decodable indicia reading terminal is configured so that the indicator light bar is capable of being in an on state with the illumination bar being in an off state;

wherein said first wavelength is substantially equal to said second wavelength;

wherein the decodable indicia reading terminal includes optics for diffusing said first light; and wherein the indicator light bar is located spatially close to the illumination light bar such that the indicator light bar camouflages the illumination light bar.

2. The decodable indicia reading terminal of claim 1, wherein said first wavelength reflects a state of said decodable indicia reading terminal.

3. The decodable indicia reading terminal of claim 1, wherein said indicator light bar can be in one of: ON state and OFF state, said state reflecting a state of said decodable indicia reading terminal.

4. The decodable indicia reading terminal of claim 1, wherein said imager based scanner further comprises a Bayer pattern filter.

5. The decodable indicia reading terminal of claim 1, wherein said illumination assembly further includes optics having diffusing and directing optical properties, said optics provided by one or more cylindrical- or wedge-shaped lens.

6. The decodable indicia reading terminal of claim 1, wherein said indicator light bar includes one or more light-emitting diodes (LEDs).

7. The decodable indicia reading terminal of claim 1, wherein said illumination light bar includes one or more LEDs.

8. The decodable indicia reading terminal of claim 1, wherein said illumination light bar is configured to pulse with a pre-defined frequency.

9. The decodable indicia reading terminal of claim 1, wherein said illumination light bar is configured to pulse with a frequency equal to a frame rate of said image sensor.

10. The decodable indicia reading terminal of claim 1, wherein said illumination light bar is configured to pulse with a pre-defined frequency; and
wherein a duration of pulses is shorter than an integration time of said image sensor.

11. The decodable indicia reading terminal of claim 1, wherein said illumination light bar is configured to pulse with a pre-defined frequency; and
wherein a duration of pulses is shorter than an integration time of a typical human eye.

12. The decodable indicia reading terminal of claim 1, wherein the indicator light bar is in an ON state with the illumination light bar in an OFF state when the decodable indicia reading terminal is powered on and a timing associated with control of the illumination light bar is intermediate of illumination pulses.

13. The decodable indicia reading terminal of claim 1, wherein the illumination light bar is for use in generating an illumination pattern substantially corresponding to a field of view associated with said multiple pixel image sensor.

14. The decodable indicia reading terminal of claim 1, wherein an ON/OFF state of the indicator light bar indicates a state of the decodable indicia reading terminal and wherein the illumination light bar is activated using illumination pulses.

15. The decodable indicia reading terminal of claim 1, wherein an ON/OFF state of the indicator light bar indicates a state of the decodable indicia reading terminal and wherein the illumination light bar is activated using illumination pulses with an illumination pulse being active during an integration time of the imager-based scanner.

16. The decodable indicia reading terminal of claim 1, wherein the indicator light bar is responsive to a scanning of decodable indicia and wherein the illumination light bar is activated using illumination pulses.

17. The decodable indicia reading terminal of claim 1, wherein the indicator light bar is responsive to a scanning of decodable indicia and wherein the illumination light bar is activated using illumination pulses with an illumination pulse being active during an integration time of the imager-based scanner.

18. The decodable indicia reading terminal of claim 1, wherein the horizontal surface includes a scanning window.

19. The decodable indicia reading terminal of claim 1, wherein the horizontal surface is textured to further diffuse the first light and the second light.

20. The decodable indicia reading terminal of claim 1, wherein the indicator light bar and the illumination light bar are located within a light bar housing.

* * * * *